United States Patent [19]
Yabe et al.

[11] Patent Number: 5,369,683
[45] Date of Patent: Nov. 29, 1994

[54] LINE CONTROL METHOD AND SYSTEM

[75] Inventors: Toshihiro Yabe; Masatoshi Nakada, both of Kawasaki, Japan

[73] Assignee: Fujitsu Limited, Kawasaki, Japan

[21] Appl. No.: 10,369

[22] Filed: Jan. 28, 1993

[30] Foreign Application Priority Data

Jan. 28, 1992 [JP] Japan .................................. 4-013184

[51] Int. Cl.⁵ .......................................... H04M 11/00
[52] U.S. Cl. ..................................... 379/59; 455/33.1; 370/95.1
[58] Field of Search .................. 379/59, 60, 61, 63; 370/95.1, 95.3, 110.1, 105.2; 455/33.1, 33.2, 34.1, 54.1, 56.1, 34.2

[56] References Cited

U.S. PATENT DOCUMENTS

| | | | |
|---|---|---|---|
| 5,142,533 | 8/1992 | Crisler et al. | 370/95.1 |
| 5,203,008 | 4/1993 | Yasuda et al. | 455/33.1 |
| 5,210,752 | 5/1993 | Ito et al. | 370/95.1 |
| 5,237,603 | 2/1993 | Yamagata et al. | 455/34.1 |

Primary Examiner—Curtis Kuntz
Assistant Examiner—I. S. Rana
Attorney, Agent, or Firm—Staas & Halsey

[57] ABSTRACT

A line control method is applied to a mobile communication system in which a mobile station communicates with one of a plurality of base stations which are installed within the same zone via a speech channel of the one base station, where the base stations have a common control channel. The line control method includes the steps of (a) storing timing information which indicates access timings of the mobile station with respect to each of the base stations and is received via the control channel, and (b) receiving control information which indicates a result of allocation of free speech channels in an arbitrary base station with respect to each call based on a predetermined call processing procedure of the arbitrary base station via the control channel, and switching the access timing of the mobile station from an access timing with respect to the arbitrary base station to an access timing with respect to one of the base stations other than the arbitrary base station and stored in the step (a), so that the mobile station communicates with the one of the base stations via a speech channel which is determined by the control information.

16 Claims, 12 Drawing Sheets

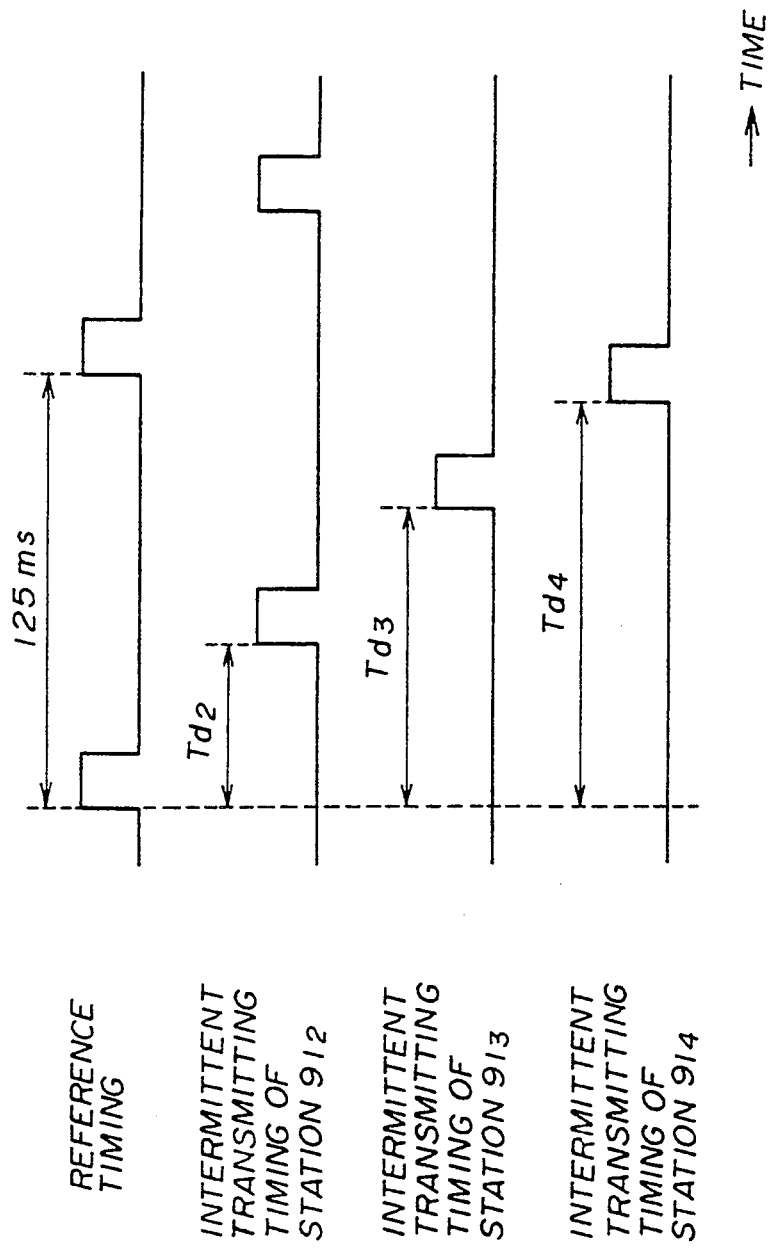

LINE CONTROL METHOD AND SYSTEM

BACKGROUND OF THE INVENTION

The present invention generally relates to line control methods and systems, and more particularly to a line control method for enabling access from a mobile station to one of a plurality of base stations, and to a line control system which employs such a line control method.

In fixed communication networks on land, integrated services digital networks (ISDNs) are becoming popular because the ISDN can cope flexibly with an increasing number of subscribers and non-telephone services, such as facsimile and data transmissions.

On the other hand, mobile communication systems which provide communication services to mobile stations, such as mobile telephones and portable telephones, are also becoming popular. In addition, in order to cope with the rapidly increasing number of subscribers and to provide various services similar to those provided by the fixed communication networks, the digital system is expected to replace the existing analog system. According to the digital mobile communication system, various kinds of processing can be carried out in the transmission path with respect to the transmitting information. The transmission characteristic of the radio line is satisfactory regardless of the information source. Furthermore, the digital mobile communication system provides an improved privacy of the communication.

FIG. 1 generally shows an example of a conventional digital mobile communication system. In FIG. 1, a base station ($CS_1$) $91_1$ is coupled to a public communication network (PSTN) via a two-wire subscriber line. Base stations ($CS_2, \ldots, CS_{N-1}$) $91_2, \ldots, 91_{N-1}$ are respectively coupled to an integrated services digital network (ISDN) via a private branch exchange (PABX) 92. A base station ($CS_N$) $91_N$ is coupled to the ISDN via a network (NCC network) which is operated by a new communication company.

The base station $91_1$ forms a private mobile communication system which is operated by a person who installs this base station $91_1$. The base station $91_1$ provides a communication service to a portable mobile station ($PS_1$) $93_1$ via a digital radio line. The base stations $91_2$ through $92_{N-1}$ form a private mobile communication system, which is operated by a person who installs these base stations $91_2$ through $92_{N-1}$ and the private branch exchange 92. The base stations $91_2$ through $92_{N-1}$ provide communication services to portable mobile stations ($PS_2$ and $PS_3$) $93_2$ and $93_3$ via digital radio lines. The base station $91_N$ forms a public mobile communication system, which is operated by a person who installs this base station $91_N$. The base station $91_N$ provides a communication service to a portable mobile station ($PS_4$) $93_4$ via a digital radio line. As indicated by a dotted line in FIG. 1, each of the base stations $91_1$ through $91_N$ can provide similar communication services to all portable mobile stations located within the respective service areas, and are not limited to providing the communication services to the specific portable mobile stations mentioned above.

In the digital mobile communication system having the construction described above, it is necessary to suppress the blocking probability by providing a large number of speech channels in each zone of the plurality of sub systems. For this reason, only one or two channels are allocated as common control channels for all of the base stations and mobile stations. The control channel is used to exchange control information between the base and mobile stations, depending on the calling and receiving operations of each mobile station.

Accordingly, the common control channel must not be continuously used by one particular base station or mobile station. For example, in the going control channel which is used when the base station accesses the mobile station, an intermittent transmission system is employed whereby each base station makes only one transmission for every period of 125 ms, as indicated by A1 in FIG. 2. On the other hand, in the returning control channel which is used when the mobile station accesses to the base station, a slotted aloha system is employed. Furthermore, as indicated by A2 in FIG. 2, for example, the mobile station carries out an intermittent receiving operation with the same timing as the intermittent transmitting timing of the base station $91_2$, which defines a zone in which this mobile station is located, and enters the control information transmitted from the base station $91_2$.

The base stations $91_1$ through $91_N$ respectively have one to three speech channels, and provide the communication service within an area which is 30 to 50 m in radius from each installation point. For example, in a zone having a relatively large amount of traffic such as in an office which is installed with the private branch exchange 92, a lack of the speech channels occurs under a large amount of traffic. For this reason, a plurality of base stations $91_2$ through $91_4$ are installed, depending on a maximum load as shown in FIG. 3, so as to provide the communication service using the load distribution system.

In the zone in which a plurality of base stations $91_2$ through $91_4$ are provided, each mobile station enters the control information and monitors the call while intermittently receiving in the going control channel which is controlled by one (for example, the base station $91_2$) of the base stations $91_2$ through $91_4$.

For example, if call with respect to the mobile station $93_2$, which monitors the call in the above described manner, is generated in a state where all of the speech channels of the base station $91_2$ allocated for the call are busy, the mobile station $93_2$ transmits a call-in answer signal via the returning control channel as shown in FIG. 4 (a) depending on the call-in signal which is received via the going control channel. However, because the base station $91_2$ cannot allocate a speech channel for the call, the base station $91_2$ transmits a channel busy signal via the going control channel. As a result, the mobile station $93_2$ carries out a disconnect process based on a predetermined control sequence and returns to a waiting state.

Similarly, if the mobile station $93_2$ calls in a state where all of the speech channels of the base station $91_2$ allocated for the call are busy, the mobile station $93_2$ transmits a call-out signal via the returning control channel, as shown in FIG. 4 (b). However, because the base station $91_2$ cannot allocate a speech channel, the base station $91_2$ transmits a channel busy signal via the going control channel. Hence, the mobile station $93_2$ carries out a disconnect process based on a predetermined control sequence, and transmits a busy tone signal so as to notify the operator that the call was not made in a normal manner.

Therefore, in the conventional digital mobile communication system, even if a free speech channel remains in at least one of the base stations other than the base station to which the mobile station accesses but are installed within the same zone, there is a problem in that the blocking probability of the entire system is large because the free speech channel is not allocated for the call. In addition, when the call generated from the mobile station is not completed, the mobile station must search for another base station within the same zone in synchronism with the intermittent transmitting and receiving operations which are carried out in the going control channel. For this reason, there is a problem in that it takes a long time to search for an appropriate base station with a free speech channel and to access thereto. Furthermore, there is also a problem in that the power consumption of the mobile station increases considerably when such a search operation is made to search for the appropriate base station.

SUMMARY OF THE INVENTION

Accordingly, it is a general object of the present invention to provide a novel and useful line control method and a line control system, in which the problems described above are eliminated.

Another and more specific object of the present invention is to provide a line control method for a mobile communication system in which a mobile station communicates with one of a plurality of base stations which are installed within the same zone. The mobile station communicates via a speech channel of the one base station. The base stations have a common control channel. The line control method comprises the steps of (a) storing timing information which indicates access timings of the mobile station with respect to each of the base stations and is received via the control channel, and (b) receiving control information which indicates a result of allocation of free speech channels in an arbitrary base station with respect to each call based on a predetermined call processing procedure of the arbitrary base station via the control channel, and switching the access timing of the mobile station from an access timing with respect to the arbitrary base station to an access timing with respect to one of the base stations other than the arbitrary base station and stored in the step (a), so that the mobile station communicates with the one of the base stations via a speech channel which is determined by the control information. According to the line control method of the present invention, even if an access is made to the arbitrary base station which has no free speech channel, it is possible to quickly access to another base station which is installed within the same zone as the arbitrary base station, thereby making it possible to quickly complete the call. In other words, the free speech channels of the base stations which are installed within the same zone are efficiently allocated to each call, and the blocking probability is suppressed. As a result, it is possible to improve the performance of the digital mobile communication system, and to also reduce the cost of installing a plurality of base stations within the same zone because of the efficient speech channel allocation.

Still another object of the present invention is to provide a line control system adapted to a mobile communication system in which a mobile station communicates with one of a plurality of base stations, which are installed within the same zone, via a speech channel of the one base station. The base stations have a common control channel. The line control system comprises storage means, provided in the mobile station, for storing timing information which indicates access timings of the mobile station with respect to each of the base stations and is received via the control channel. The line control system further comprises control means, coupled to the storage means and provided in the mobile station, for receiving control information which indicates a result of the allocation of free speech channels in an arbitrary base station with respect to each call based on a predetermined call processing procedure of the arbitrary base station via the control channel. The control means also switches the access timing of the mobile station from an access timing with respect to the arbitrary base station to an access timing with respect to one of the base stations other than the arbitrary base station and stored in the storage means, so that the mobile station communicates with the one of the base stations via a speech channel which is determined by the control information. According to the line control system of the present invention, even if an access is made to the arbitrary base station which has no free speech channel, it is possible to quickly access to another base station which is installed within the same zone as the arbitrary base station, thereby making it possible to quickly complete the call. In other words, the free speech channels of the base stations which are installed within the same zone are efficiently allocated to each call, and the blocking probability is suppressed. As a result, it is possible to improve the performance of the digital mobile communication system, and to also reduce the cost of installing a plurality of base stations within the same zone because of the efficient speech channel allocation.

Other objects and further features of the present invention will be apparent from the following detailed description when read in conjunction with the accompanying drawings.

BRIEF DESCRIPTION OF THE DRAWINGS

FIG. 12 is a timing chart for explaining time slot positions of the control channel.

DESCRIPTION OF THE PREFERRED EMBODIMENTS

Figure 5:
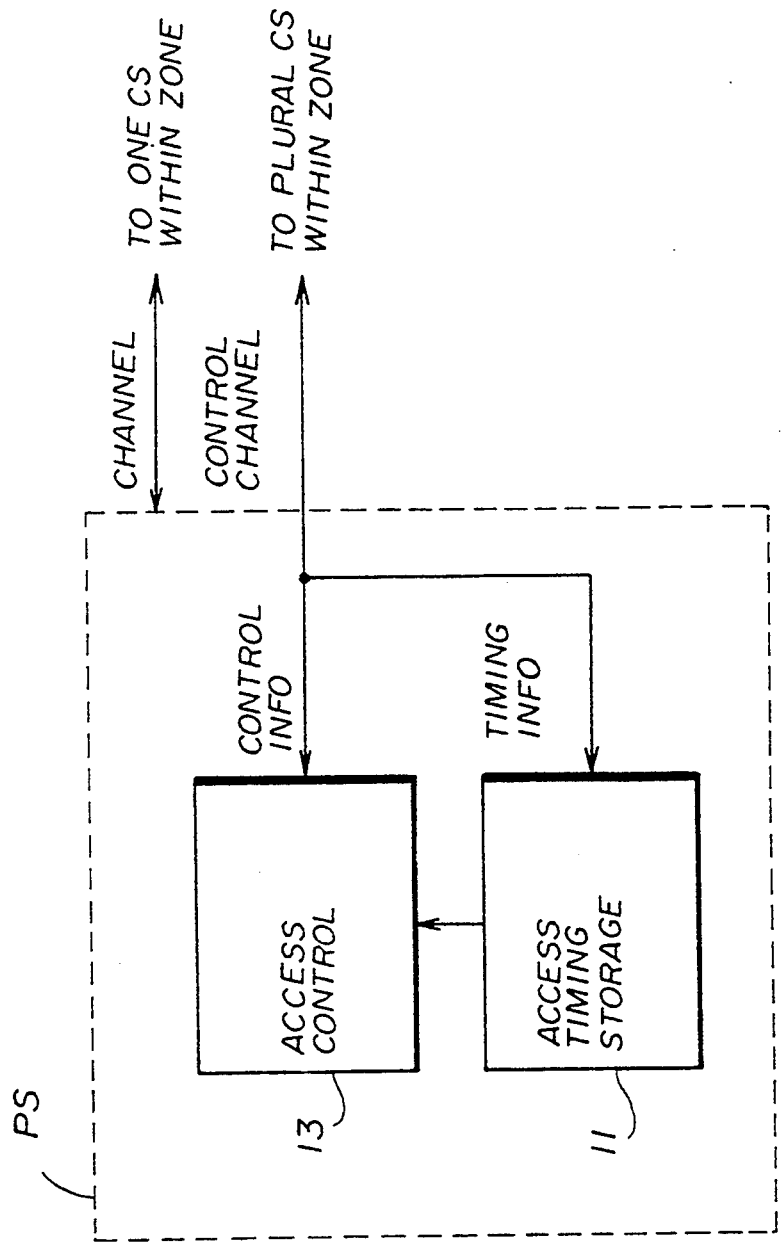
FIG. 5 is a system block diagram for explaining the operating principle of the present invention.

First, a description will be given of the operating principle of the present invention, by referring to FIG. 5. FIG. 5 shows an essential part of a mobile station PS. As shown in FIG. 5, the mobile station PS includes access timing storage means 11 and access control means 13.

The mobile station PS is used in a mobile communication system in which a plurality of base stations CS process calls generated within the zone of the base stations CS according to the load distribution system. A common control channel is allocated to the plurality of base stations CS according to the time division multiplexing access (TDMA). Timing information which determines the access timings to the plurality of base stations CS which use the speech channel, and control information which indicates the result of allocating the free speech channel to each call based on the call processing procedure are transmitted via the control channel. Hence, the mobile station PS accesses access to the base station CS via the control channel and a communication is made via the speech channel, which is indicated by the control information.

The access timing storage means 11 of the mobile station PS reads the timing information via the control channel, and stores all of the access timings of the base stations CS determined by the timing information. On the other hand, the access control means 13 of the mobile station PS reads the control information via the control channel, and switches the access timing to one of the access timings stored in the access timing storage means 11 based on the control information, so as to repeat the access.

Before the mobile station PS exchanges various kinds of information related to the generated call between one base station CS via the control channel, the access timing storage means 11 of the mobile station PS receives the timing information from the one base station CS and stores the access timings with respect to all of the base stations CS which are installed in the same zone as the one base station CS based on the contents of the timing information. If the access control means 13 of the mobile station PS receives via the control channel control information, which indicates that no speech channel could be allocated to the call, the access control means 13 switches the access timing to the control channel to one of the access timings which are stored in the access timing storage means 11.

In other words, even if the access is made in response to the generated call to one base station CS which does not have a free speech channel, the mobile station PS quickly switches the access timing with respect to the other base stations CS which are installed within the same zone as the one base station CS via the control channel to one of the stored access timings, and repeats the access operation which is necessary to complete the call. As a result, the free speech channels of the other base stations CS are efficiently allocated to the mobile station PS.

For example, the mobile station PS is a portable station of a radio telephone set for home use. On the other hand, the base stations CS which are installed within the same zone are provided at a train station, for example. In this case, the portable station can be used not only at home, but also at the train station.

As another example of the application of the present invention, the mobile station PS is a portable station of a radio telephone set provided in an office building. On the other hand, the base stations CS which are installed within the same zone are provided at a company premises which is adjacent to the office building. In this case, the portable station can be use not only within the office building, but also within the adjacent company premises.

Next, a description will be given of an embodiment of the line control system according to the present invention, by referring to FIG. 6.

Figure 6:
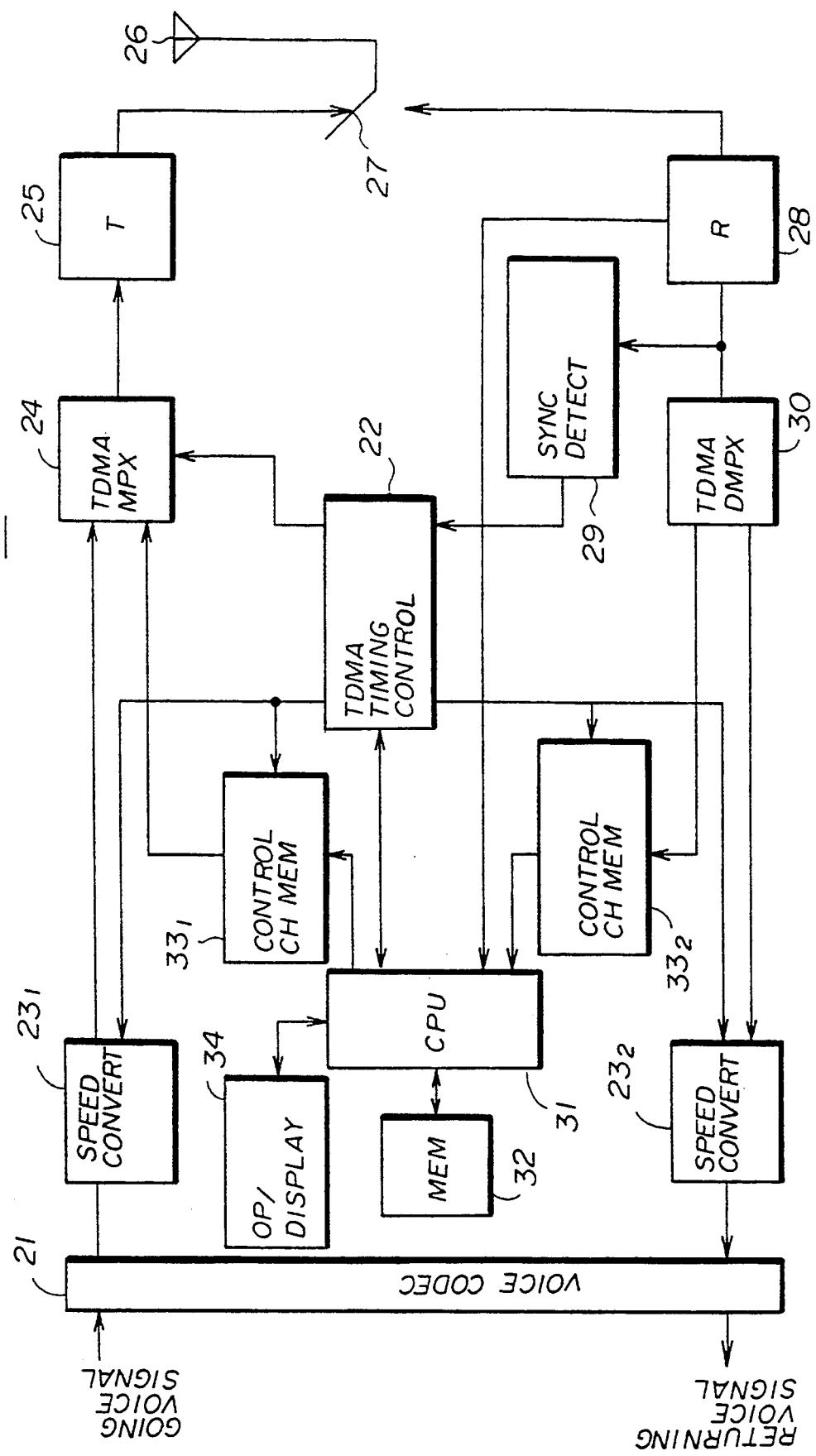
FIG. 6 is a system block diagram showing an essential part of a mobile station which is used in an embodiment of a line control system according to the present invention.

In a mobile station PS shown in FIG. 6, an output of a voice codec 21 which converts a going voice signal into a predetermined digital code is connected to a speed converter $23_1$ which adapts the speed of the digital code to the transmission speed of the speech channels under the control of a TDMA timing controller 22. An output of the speed converter $23_1$ is connected to a first input of a TDMA multiplexer 24 which carries out a multiplexing process on the output of the speed converter $23_1$ depending on the transmission frame format to the speech channel and the control channel under the control of the TDMA timing controller 22. An output of the TDMA multiplexer 24 is connected to a modulation input of a transmitter 25 which transmits to the control channel or the speech channel. An output of the transmitter 25 is connected to one contact of an antenna switch 27 which switches the connection to an antenna 26 depending on the transmitting and receiving timings of the channels.

The other contact of the antenna switch 27 is connected to an input of a receiver 28 which obtains a demodulated output of the signal which is received from the control channel or the speech channel. An output of the receiver 28 is connected to an input of a synchronous detector 29 which synchronizes the received frames included in the demodulated output and to an input of a TDMA demultiplexer 30 which carries out a process complementary to that carried out by the TDMA multiplexer 24 on the demodulated output. An output of the synchronous detector 29 is connected to a synchronous input of the TDMA timing controller 22. One output of the TDMA demultiplexer 30 is connected to an input of a speed converter $23_2$ which under the control of the TDMA timing controller 22 carries out a process complementary to the process carried out by the speed converter $23_1$. An output of the speed converter $23_2$ is connected to an input of the voice codec 21 which converts the output signal of the speed converter $23_2$ into an analog returning voice signal.

A microprocessor (CPU) 31 centrally controls the entire mobile station PS shown in FIG. 6 based on a predetermined control sequence. A bus of the CPU 31 is connected to a memory 32 which stores various information including the necessary software for determining the predetermined control sequence and various control information. Input/output terminals of the CPU 31 are connected to a control channel memory $33_1$ which temporarily stores the data which is to be transmitted to the control channel, a control channel memory $33_2$ which temporarily stores the data which is received from the control channel, a display/operation part 34, the TDMA timing controller 22, and the receiver 28. The control channel memories $33_1$ and $33_2$ forms an interface between the above described software and the TDMA multiplexer 24 and the TDMA demultiplexer 30, under the control of the TDMA timing controller 22.

In this embodiment, an essential part of the present invention is realized by the control operation of the software of the CPU 31. Furthermore, the memory 32, the control channel memory $33_1$, the TDMA timing controller 22, the TDMA multiplexer 24, the transmitter 25, the receiver 28, the synchronous detector 29, the TDMA demultiplexer 30 and the control channel memory $33_2$ are also used in common for the normal process carried out by the CPU 31 and the transmission and reception of the voice signal via the speech channel. For this reason, a description on the correspondence of each block shown in FIG. 6 and the blocks shown in FIG. 5 will be omitted.

Figure 7:
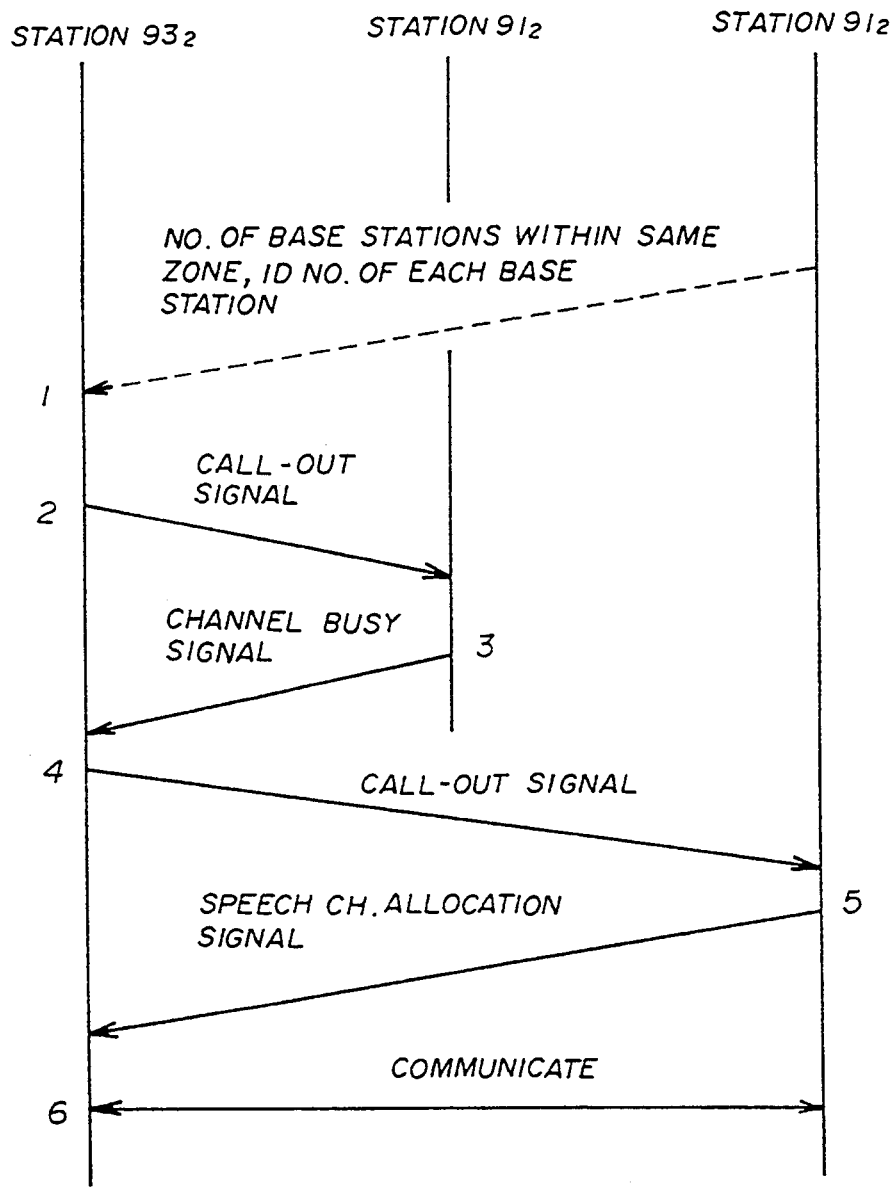
FIG. 7 is a diagram for explaining the operation of the embodiment.
Figure 8:
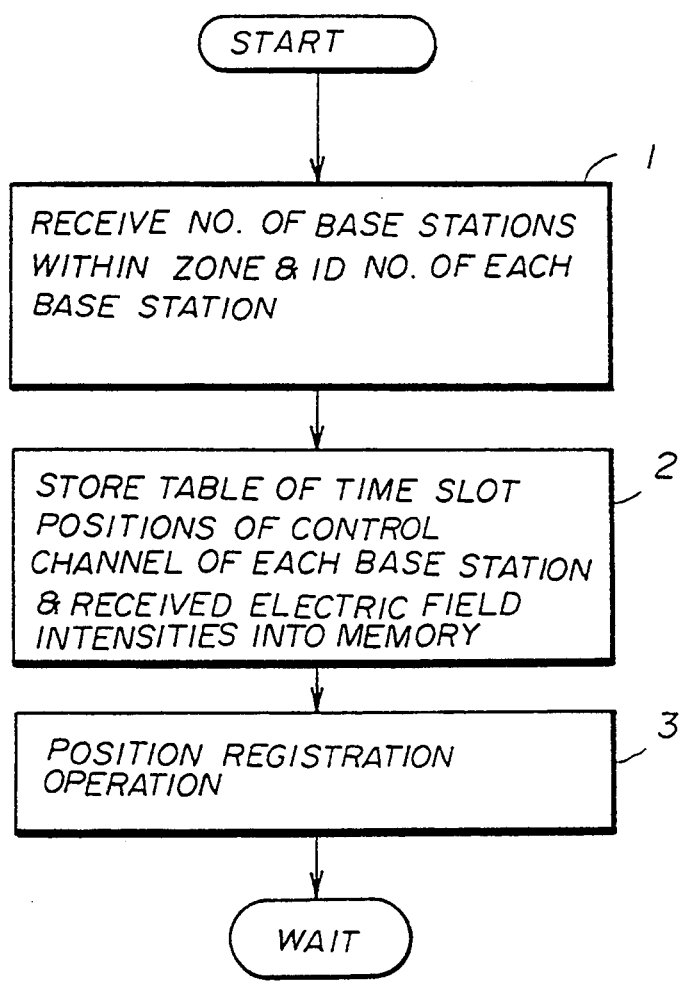
FIG. 8 is a flow chart far explaining the operation of the mobile station until it reaches a waiting state.
Figure 9:
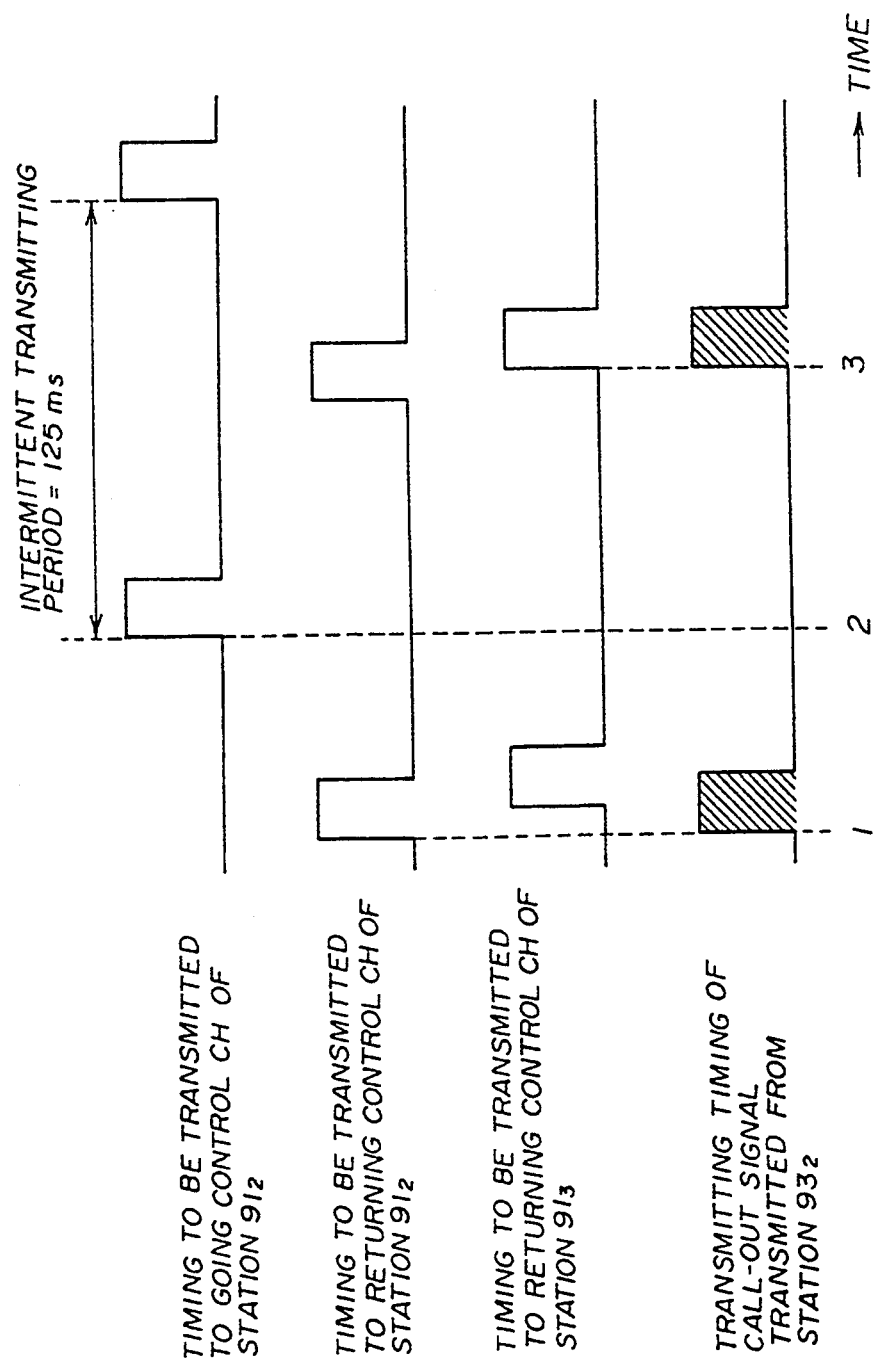
FIG. 9 is a timing chart for explaining the operation of the embodiment.

FIG. 7 is a diagram for explaining the operation of this embodiment, and FIG. 8 is a flow chart for explaining the operation of the mobile station PS until it reaches the waiting state. FIG. 9 is a timing chart for explaining the operation of this embodiment.

Figure 1:
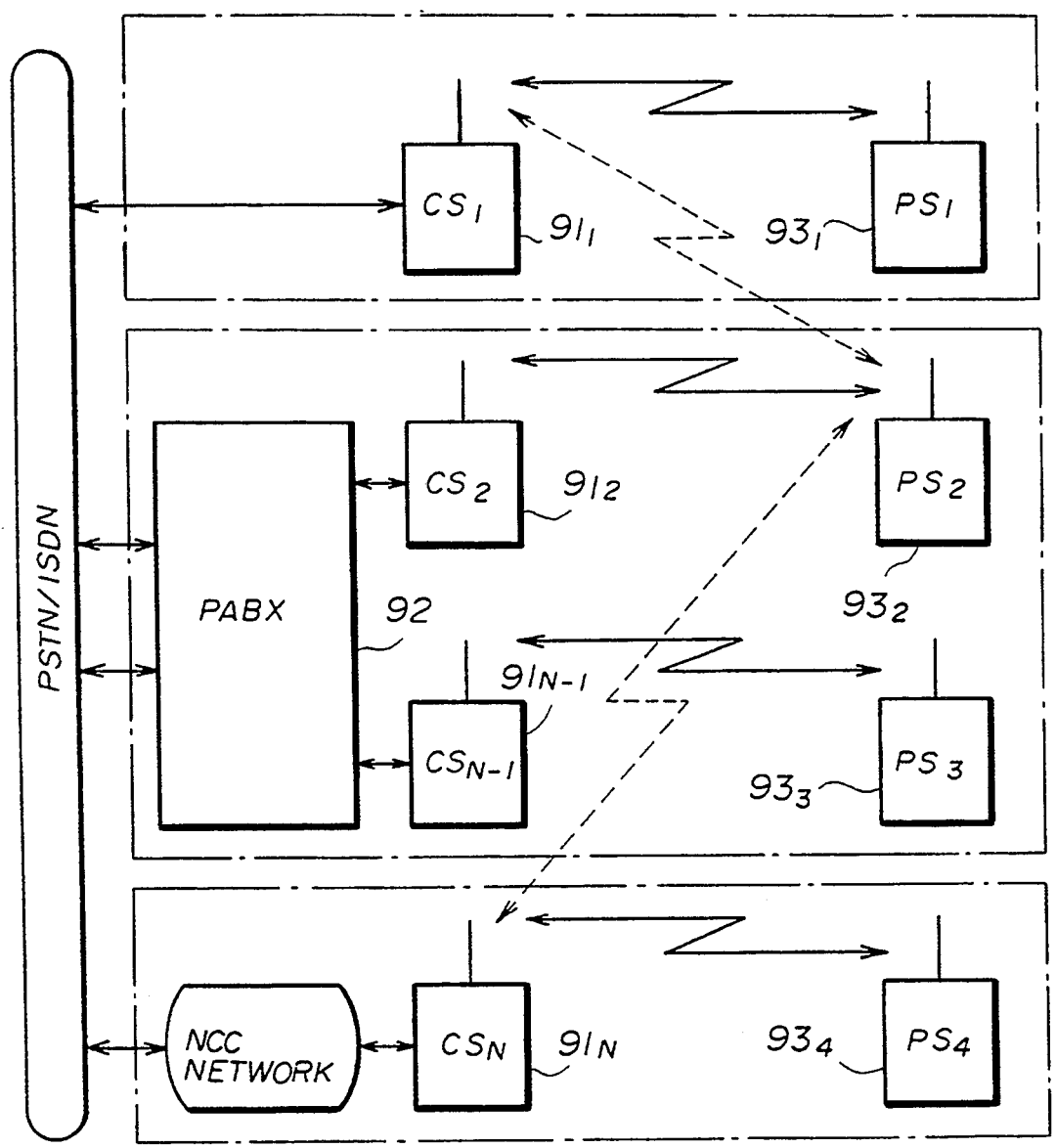
FIG. 1 is a system block diagram generally showing an example of a conventional digital mobile communication system.
Figure 2:
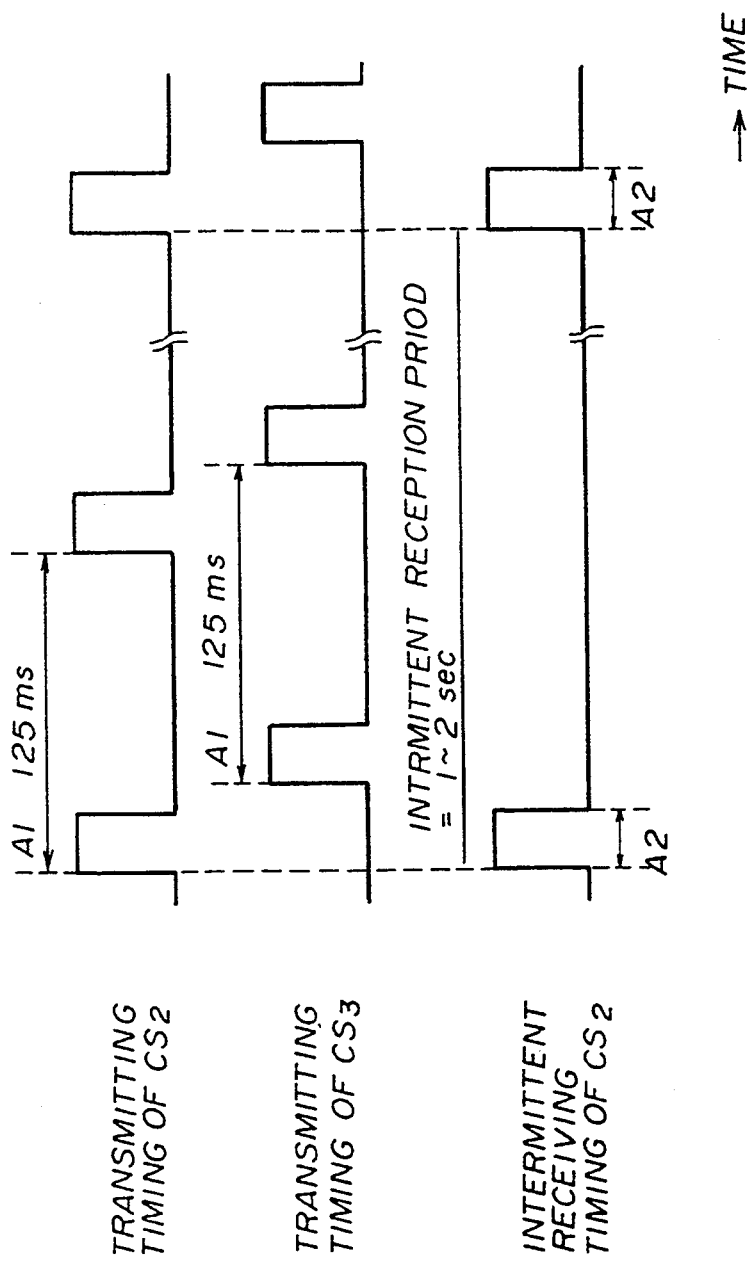
FIG. 2 is a timing chart for explaining transmission timings of base and mobile stations.
Figure 3:
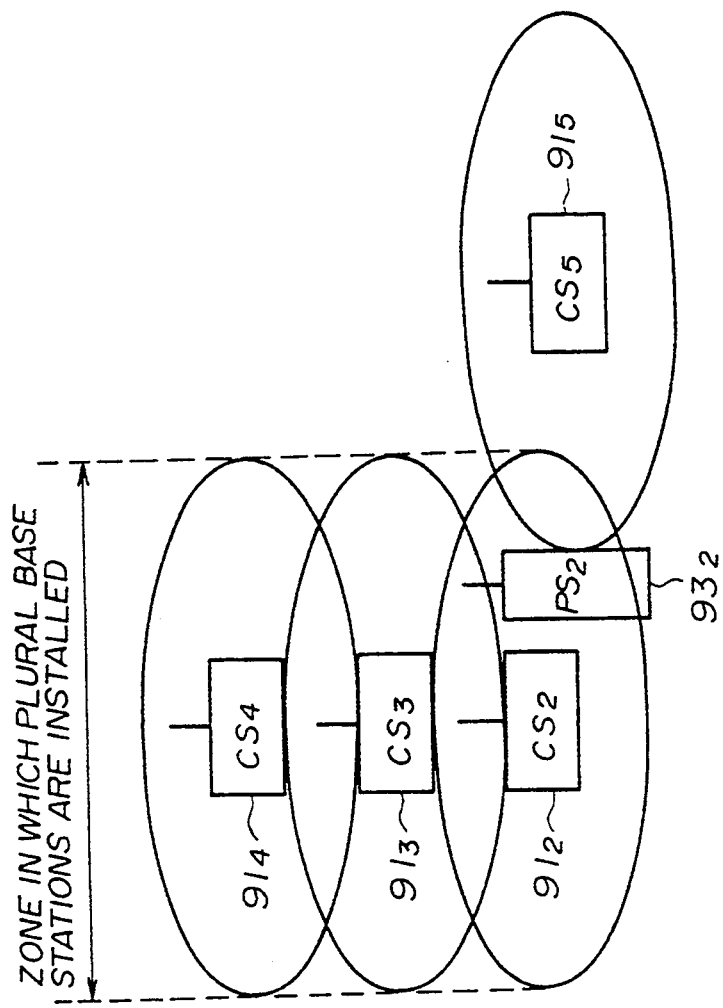
FIG. 3 is a diagram showing an example of a zone structure.
Figure 4B:
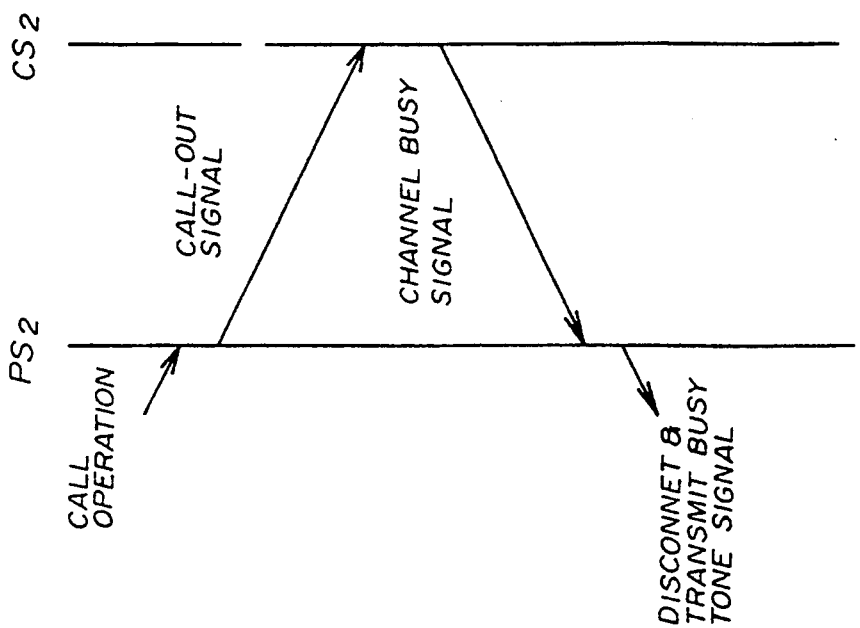
FIGS. 4 (a) and 4 (b) are diagrams for explaining calling and receiving operations for a case where no free speech channel exists.
Figure 4A:
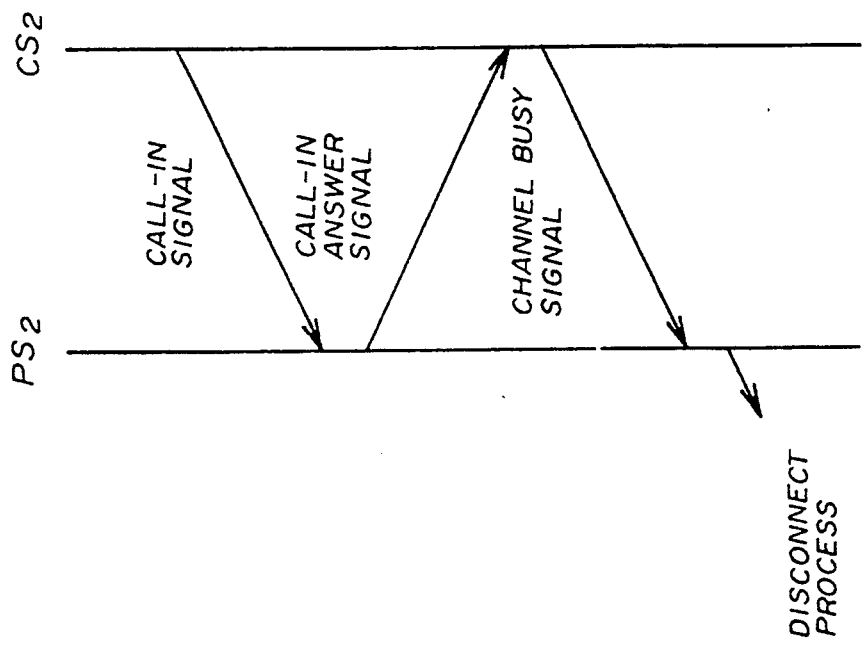

In the following description of this embodiment with reference to FIGS. 6 through 12, it will be assumed that for the sake of convenience that the mobile station PS shown in FIG. 6 is used as the mobile station $93_2$ shown in FIG. 1, and that this mobile station 93 makes accesses to one of the three base stations $91_2$ through $91_4$ which are installed within the same zone as shown in FIG. 3.

Figure 10:
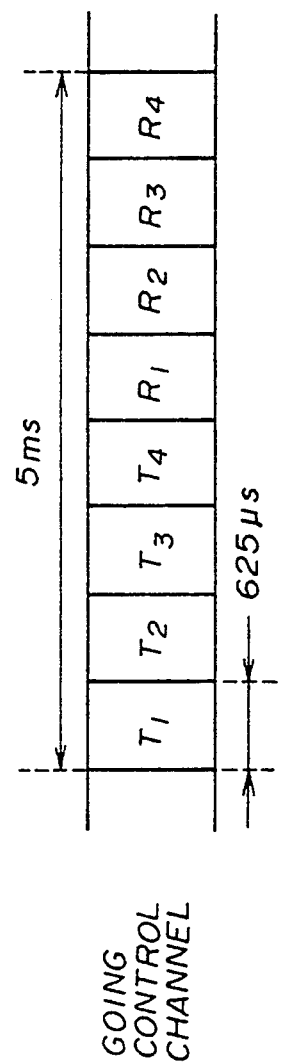
FIG. 10 shows the structure of a TDMA frame.

A TDMA frame shown in FIG. 10 having a length of 5 ms is exchanged recyclically between the mobile station $93_2$ and the base stations $91_2$ through $91_4$ via the control channel. As shown in FIG. 10, the TDMA frame has four consecutive transmitting time slots $T_1$ through $T_4$ and four consecutive receiving time slots $R_1$ through $R_4$ arranged adjacent to each other on the time base.

Figures 11A, 11B:
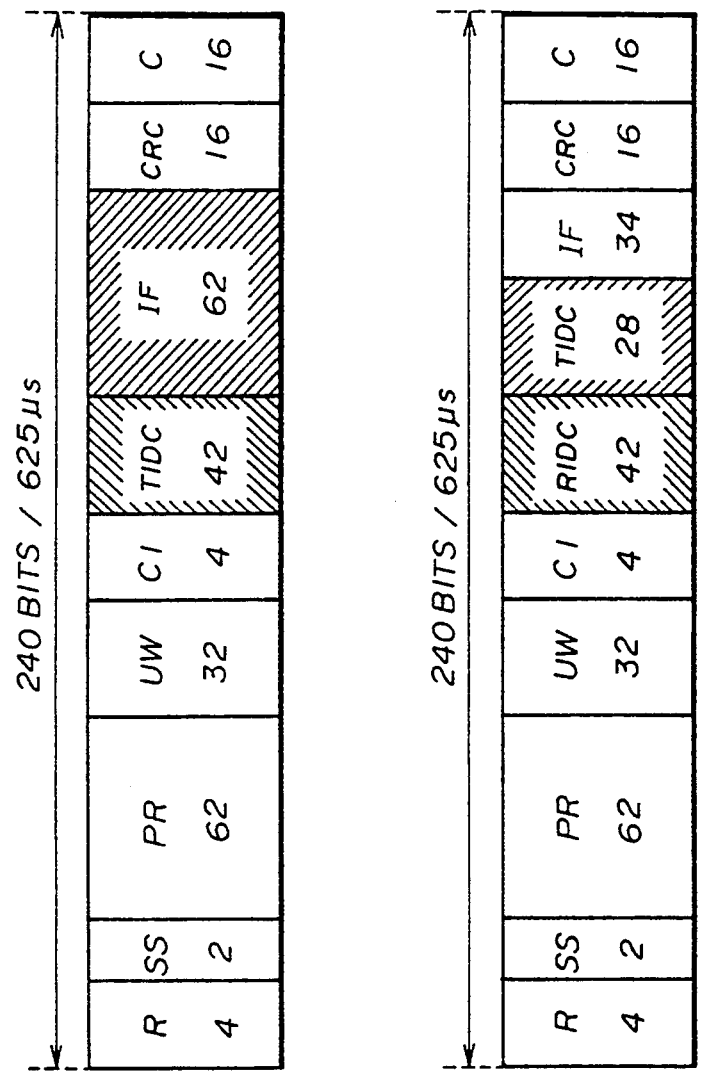
FIGS. 11 (a) and 11 (b) show formats of data transmitted and received via the control channel.

As indicated by the hatchings in FIG. 11 (a), the base stations $91_2$ through $91_4$ respectively transmit via the going control channel a 42-bit transmitting identification code field TIDC and a 62-bit information field IF in the corresponding transmitting time slot. The identification number of the concerned base station is arranged in the 42-bit transmitting identification code field TIDC. On the other hand, the number of base stations installed within the same zone as the concerned base station, and the identification numbers of each of these base stations are arranged in the 62-bit information field IF.

In this kind of a time slot shown in FIG. 11 (a), a 4-bit ramp bit R for transient response, a 2-bit start symbol SS, a 62-bit preamble PR, a 32-bit unique word UW and a 4-bit channel type information CI are arranged before the 42-bit transmitting identification code field TIDC and the 62-bit information field IF. In addition, a 16-bit check bit CRC and a 16-bit guard bit G are arranged after the 62-bit information field IF.

On the other hand, as indicated by the hatchings in FIG. 11 (b), the mobile station $93_2$ transmits via the returning control channel a 42-bit receiving identification code field RIDC and a 28-bit transmitting identification code field TIDC in the corresponding transmitting time slot. The format of this time slot shown in FIG. 11 (b) is basically the same as that shown in FIG. 11 (a), except that the 42-bit receiving identification code field RIDC, the 28-bit transmitting identification code field TIDC and a 34-bit information field IF shown in FIG. 11 (b) are provided in place of the 42-bit transmitting identification code field TIDC and 62-bit information field IF shown in FIG. 11 (a).

The contents of the 42-bit transmitting identification code field TIDC in the time slot which is transmitted in the going control channel, and the contents of the 42-bit receiving identification code field RIDC and the 28-bit transmitting identification code field TIDC in the time slot which is transmitted in the returning control channel, are used to avoid an unnecessary calling process from being started due to an over-reach or the like, by mutually deciding in the mobile station and the base station whether or not the control information is that which is exchanged between the mobile station and the base station of the zone in which the mobile station is actually located.

When the mobile station $93_2$ enters the above described zone or the power source of the mobile station $93_2$ is turned ON within this zone, the CPU 31 of the mobile station $93_2$ measures the electric field level of all of the control channels via the receiver 28. The CPU 31 recognizes as a home zone a zone which corresponds to the control channel from which the maximum electric field level is measured.

In addition, the CPU 31 reads the number of base stations and the identification number of each of these base stations which are received in the going control channel of the home zone, via the receiver 28, the TDMA demultiplexer 30 and the control channel memory $33_2$, as indicated by "1" in FIGS. 7 and 8. Based on the timing with which the synchronous detector 29 detects the unique word UW from the demodulated output signal from the receiver 28, the CPU 31 controls the TMDA timing controller 22 to search for the transmitting time slot positions of the control channel of each of the base stations having the read identification numbers. The CPU 31 measures the electric field intensity at each of the searched transmitting time slot positions. The transmitting time slot position can be obtained as a delay time with respect to a reference timing which arrives for every 125 ms. For example, the transmitting time slot positions of the base stations $91_2$ through $91_4$ can respectively be obtained as values $T_{d2}$ through $T_{d4}$ in FIG. 12.

When the CPU 31 completes the above described process, the CPU 31 generates a table in which each transmitting time slot and the measured electric field intensity at the transmitting time slot are made to correspond to the identification number of the corresponding base station. As indicated by "2" in FIG. 8, the CPU 31 stores this table in the memory 32. In addition, the CPU 31 assumes a waiting state at the control channel which is controlled by the base station from which the maximum electric field intensity is measured in the home zone. For example, the maximum electric field intensity is measured from the base station $91_2$. Furthermore, the CPU makes a position registration operation based on a predetermined control sequence, as indicated by "3" in FIG. 8. Thereafter, the CPU 31 monitors the call to the mobile station $93_2$ to which the CPU 31 belongs by returning to the same control channel and making an intermittent receiving operation.

If the subscriber of the mobile station $93_2$ makes a call in a state where all of the speech channels of the base station $91_2$ allocated for the call are busy, the CPU 31 transmits a call-out signal to the returning control channel via the control channel memory $33_1$, the TDMA multiplexer 24 and the transmitter 25, as indicated by "2" in FIG. 7 and by "1" in FIG. 9. In this case, the base station $91_2$ transmits a channel busy signal to the going control channel in response to the call-out signal, as indicated by "3" in FIG. 7 and by "2" in FIG. 9.

When the CPU 31 of the mobile station $93_2$ receives the channel busy signal via the receiver 28, the TDMA demultiplexer 30 and the control channel memory $33_2$, the CPU 31 searches for one of the base stations which are installed within the same zone as the base station $91_2$ and from which the maximum electric field intensity is measured, by referring to the table which is stored in the memory 32. If the maximum electric field intensity is measured from base station $91_3$, for example, the CPU 31 obtains the slot number of the control channel of this base station $91_3$ by referring to the table, and then transmits a call-out signal to the base station $91_3$ via the returning control channel which is indicated by the slot number, as indicated by "4" in FIG. 7 and by "3" in FIG. 9.

The base station $91_3$ searches for a free speech channel in response to the call-out signal. If a free speech channel exists, the base station $91_3$ transmits a speech channel allocation signal which indicates the identification information related to the free speech channel to the mobile station $93_2$ via the going control channel, as indicated by "5" in FIG. 7. Accordingly, the mobile station $93_2$ can communicate via the speech channel of the base station $91_3$ which is installed within the same zone as the base station $91_2$ to which the access was initially made at the time when the call was made, as indicated by "6" in FIG. 7.

In other words, the mobile station stores the table which is obtained in advance by searching in advance the plurality of base stations which are installed within the same zone in which the mobile station is located. For this reason, even if all of the speech channels of a concerned base station allocated for the call and to which the mobile station initially makes access are busy, the mobile station can quickly recognize the other base stations within the same zone as the concerned base station by referring to the table and call with respect to one of the other base stations. Therefore, the speech channels of the plurality of base stations which are installed within the same zone can efficiently be allocated for the call.

On the other hand, if a call-in is made at the mobile station $93_2$ which is in the waiting state at the control channel of the base station $91_2$ in a state where all of the speech channels of this base station $91_2$ allocated for the call are busy, the base stations $91_2$ through $91_4$ broadcast the call-in signal to the corresponding going control channel in response to the call-in, and the base station $91_2$ transmits a channel busy signal to the going control channel in response to a call-in answer signal which is transmitted from the mobile station $93_2$ depending on the call-in signal.

When the CPU 31 of the mobile station $93_2$ receives the channel busy signal via the receiver 28, the TDMA demultiplexer 30 and the control channel memory $33_2$, the CPU 31 refers to the table which is stored in the memory 32. The CPU 31 selects one of the base stations which are installed within the same zone as the base station $91_2$ and from which the maximum electric field intensity is received. For example, it is assumed that the maximum electric field intensity is received from the base station $91_3$. The CPU 31 reads the slot number of the control channel of the selected base station $91_3$, and transmits the call-in answer signal via the returning control channel which is indicated by the slot number.

The base station $91_3$ which receives the above call-in answer signal provides the communication service by allocating the free speech channel of the base station $91_3$ to the mobile station $93_2$ in place of the base station $91_2$. Hence, similarly as in the case of the call out described above, the speech channels of the plurality of base stations installed within the same zone are efficiently allocated for the call-in of the mobile station.

The mobile station may hold the above described table in the memory while the mobile station moves to another zone and returns to the original zone. In this case, it becomes unnecessary to make a new table again when the mobile station enters the original zone, and the call-out and call-in may be made by referring to the prestored table.

In the embodiment described above, if the mobile station generates a call but a first base station to which the mobile station initially makes access does not have a free speech channel, the mobile station is notified of the channel busy state. Hence, the mobile station accesses to another base station which is installed within the same zone as the first base station in response to such a notification from the first base station. However, in a zone which is controlled by a single base station and in which the amount of traffic is relatively small, it is possible to transmit the notifying information from the single base station to all mobile stations located within the zone via the going control channel before allocating this control channel as a speech channel. In this case, the position registration operation of the mobile station is held depending on the notifying information, so that the waiting state of the mobile station continues until the control channel is restored and no longer used as the speech channel.

In this embodiment, the notifying signal which includes the number of base stations installed within one zone and the identification information thereof is stored in the memory only when the mobile station enters this one zone or when the power source of the mobile station is turned ON within this one zone. However, the timing with which the notifying signal is stored in the memory is not limited to that of the described embodiment. For example, the mobile station may periodically or automatically carry out the process of storing the notifying signal into the memory.

This embodiment switches the access timing only for the access to the control channel which is necessary to complete the call generated at the mobile station. However, the switching of the access timing is not limited to such. For example, it is possible to maintain the switched access timing even after the call becomes incompleted. In addition, it is also possible to switch the access timing even during the waiting state of the mobile station at which no call is generated, based on the memory contents and responsive to a predetermined control signal which is transmitted from the base station.

Further, the present invention is not limited to these embodiments, but various variations and modifications may be made without departing from the scope of the present invention.

What is claimed is:

1. A line control method for a mobile communication system in which a mobile station communicates with a first base station of a plurality of base stations, which are installed within a common zone, via a free speech channel of said first base station, said plurality of base stations having a common control channel, said line control method comprising the steps of:

(a) storing, in the mobile station, timing information which indicates to the mobile station the corresponding access timings of the plurality of base stations installed within the common zone, and which is received via the common control channel; and (b) receiving control information which indicates a result of an allocation of free speech channels, in the first of said plurality of base stations and with respect to each call, based on a predetermined call processing procedure of the first base station via the common control channel, and switching, by the mobile station, the access timing of the mobile station from the access timing corresponding to the first base station to the access timing corresponding to a second base station, of the plurality of base stations and stored in said step (a), so that the mobile station communicates with said second of the base stations via a free speech channel which is determined by the control information.

2. The line control method as claimed in claim 1, wherein the predetermined call processing procedure employs a load distribution system, and the control channel employs a time division multiplexing access.

3. The line control method as claimed in claim 1, wherein said step (b) further comprises the step of successively switching, by the mobile station, between the access timings of the mobile station corresponding to each of the plurality of base stations until a free speech channel of one of the plurality of base stations is found.

4. The line control method as claimed in claim 1, wherein said step (b) further comprises the step of switching, by the mobile station, between the access timings of the mobile station corresponding to each of the plurality of base stations if all free speech channels of the first base station allocated for a call are busy.

5. The line control method as claimed in claim 1, wherein said step (a) further comprises the steps of:
measuring electric field intensity from each of the base stations;
receiving specific information indicating a number of the plurality of base stations installed within the same zone and an identification number of each of the plurality of base stations; and
making a table of the access timings with respect to each of the plurality of base stations and electric field intensities received from each of the plurality of base stations, based on the specific information and the electric field intensity from each of the plurality of base stations.

6. The line control method as claimed in claim 5, wherein said step (b) further comprises the step of:
receiving the control information via the common control channel of one of the plurality of base stations from which a maximum electric field intensity is received, based on the table made in said step (a).

7. The line control method as claimed in claim 5, wherein said each of said base stations supports plural free speech channels, further comprising:
putting the mobile station in a waiting state at a control channel of one of the plurality of base stations from which a maximum electric field intensity is received, based on the table made in said step (a) if all of said free speech channels, of the one of the plurality of base stations, are busy.

8. The line control method as claimed in claim 1, wherein said step (a) is carried out periodically.

9. A line control system adapted to a mobile communication system in which a mobile station communicates with one of a plurality of base stations, which are installed within a common zone, via a free speech channel of said one base station, said base stations having a common control channel, said line control system comprising:
storage means, provided in the mobile station, for storing timing information which indicates to the mobile station the corresponding access timings of the plurality of base stations installed within the common zone and is received via the common control channel; and
control means, coupled to said storage means and provided in the mobile station, for receiving control information which indicates a result of an allocation of free speech channels, in the one base station and with respect to each call, based on a predetermined call processing procedure of the one base station via the common control channel, and for switching the access timing of the mobile station from the access timing corresponding to the one base station to the access timing corresponding to another of the base stations and stored in said storage means, so that the mobile station communicates with said another of the base stations via a free speech channel which is determined by the control information.

10. The line control system as claimed in claim 9, wherein the predetermined call processing procedure further comprises a load distribution system, and the common control channel further comprises a time division multiplex access.

11. The line control system as claimed in claim 9, wherein said control means successively switches the access timing of the mobile station between the access timing corresponding to each base station of the plurality of base stations until a free speech channel of one of the plurality of base stations is found.

12. The line control system as claimed in claim 9, wherein said control means switches the access timing of the mobile station between the access timing corresponding to each base station of the plurality of base stations if all free speech channels of the one base station allocated for the call are busy.

13. The line control system as claimed in claim 9, which further comprises:
first means, provided in the mobile station, for measuring electric field intensity from each of the plurality of base stations and for receiving specific information indicating a number of the plurality of base stations installed within the same zone and an identification number of each of the plurality of base stations; and
second means, coupled to said first means and provided in the mobile station, for making a table of the access timings corresponding to each of the plurality of base stations and electric field intensities received from each of the plurality of base stations, based on the specific information and the electric field intensity, and for storing the table in said storage means.

14. The line control system as claimed in claim 13, wherein said control means includes means for receiving the control information via the control channel of a base station from which a maximum electric field intensity is received, based on the table stored in said storage means.

15. The line control system as claimed in claim 13, wherein each of said base stations supports plural free speech channels and said control means further comprises means for putting the mobile station in a waiting state at a control channel of one base station of the plurality of base stations from which a maximum electric field intensity is received, based on the table stored in said storage means, if all of the free speech channels in the one base station are busy.

16. The line control system as claimed in claim 9, wherein said control means switches the access timing periodically.

* * * * *

UNITED STATES PATENT AND TRADEMARK OFFICE
CERTIFICATE OF CORRECTION

PATENT NO. : 5,369,683
DATED : November 29, 1994
INVENTOR(S) : Toshihiro YABE et al.

It is certified that error appears in the above-indentified patent and that said Letters Patent is hereby corrected as shown below:

Col. 1, line 43, after "system" insert --,--.
Col. 2, line 15, delete "to";
line 27, after "traffic" insert --,--; and
line 52, change "932" to --$93_2$--.
Col. 3, line 51, delete "to".
Col. 4, line 23, delete "to" (second occurrence).
Col. 5, line 22, delete "access to".
Col. 6, line 7, change "use" to --used--.
Col. 7, line 25, change "93 makes" to --$93_2$--; and
line 26, delete "to".
Col. 10, line 21, delete "to".

Signed and Sealed this

Eighteenth Day of July, 1995

Attest:

BRUCE LEHMAN

*Attesting Officer*  *Commissioner of Patents and Trademarks*